United States Patent
Green et al.

(10) Patent No.: US 9,326,333 B2
(45) Date of Patent: Apr. 26, 2016

(54) FLYBACK DRIVER FOR USE IN A FLYBACK POWER CONVERTER AND RELATED METHOD

(75) Inventors: Peter B. Green, Rancho Palos Verdes, CA (US); Dana Wilhelm, Temple City, CA (US)

(73) Assignee: Infineon Technologies Americas Corp., El Segundo, CA (US)

( * ) Notice: Subject to any disclaimer, the term of this patent is extended or adjusted under 35 U.S.C. 154(b) by 632 days.

(21) Appl. No.: 13/273,531

(22) Filed: Oct. 14, 2011

(65) Prior Publication Data

US 2013/0093356 A1    Apr. 18, 2013

(51) Int. Cl.
- H05B 41/28    (2006.01)
- H05B 33/08    (2006.01)
- H02M 3/335    (2006.01)
- H02M 1/42    (2007.01)

(52) U.S. Cl.
CPC ....... *H05B 33/0815* (2013.01); *H02M 3/33523* (2013.01); *H02M 1/4258* (2013.01); *H05B 33/0818* (2013.01); *Y02B 70/126* (2013.01)

(58) Field of Classification Search
USPC ....... 315/291, 224, 225, 247, 185 S, 307–311
See application file for complete search history.

(56) References Cited

U.S. PATENT DOCUMENTS

| | | | |
|---|---|---|---|
| 8,143,800 B2* | 3/2012 | Liu et al. | 315/247 |
| 8,698,421 B2* | 4/2014 | Ludorf | H02M 1/4258 |
| | | | 315/209 R |
| 2012/0081039 A1* | 4/2012 | Yang et al. | 315/307 |
| 2012/0262961 A1* | 10/2012 | Chien et al. | 363/84 |
| 2012/0319621 A1* | 12/2012 | Sutardja et al. | 315/307 |
| 2013/0049589 A1* | 2/2013 | Simi | 315/85 |
| 2013/0169162 A1* | 7/2013 | Simi | 315/127 |
| 2013/0175983 A1* | 7/2013 | Partovi et al. | 320/108 |
| 2014/0346973 A1* | 11/2014 | Zhu et al. | 315/307 |

* cited by examiner

*Primary Examiner* — Tuyet Vo
(74) *Attorney, Agent, or Firm* — Farjami & Farjami LLP

(57) ABSTRACT

According to one embodiment, a flyback power converter comprises a primary circuit including a flyback driver, and an isolated output circuit responsive to the primary circuit. The isolated output circuit is used to power a load. The flyback driver is configured to identify a load current in the isolated output circuit from an input power to the primary circuit, and to regulate the load current according to the input power. In one embodiment, the flyback driver is configured to sense an input voltage to the flyback power converter, to identify an average current value corresponding to a current through a converter switch in the primary circuit, and to multiply the average current value and the input voltage to determine the input power to the primary circuit.

20 Claims, 3 Drawing Sheets

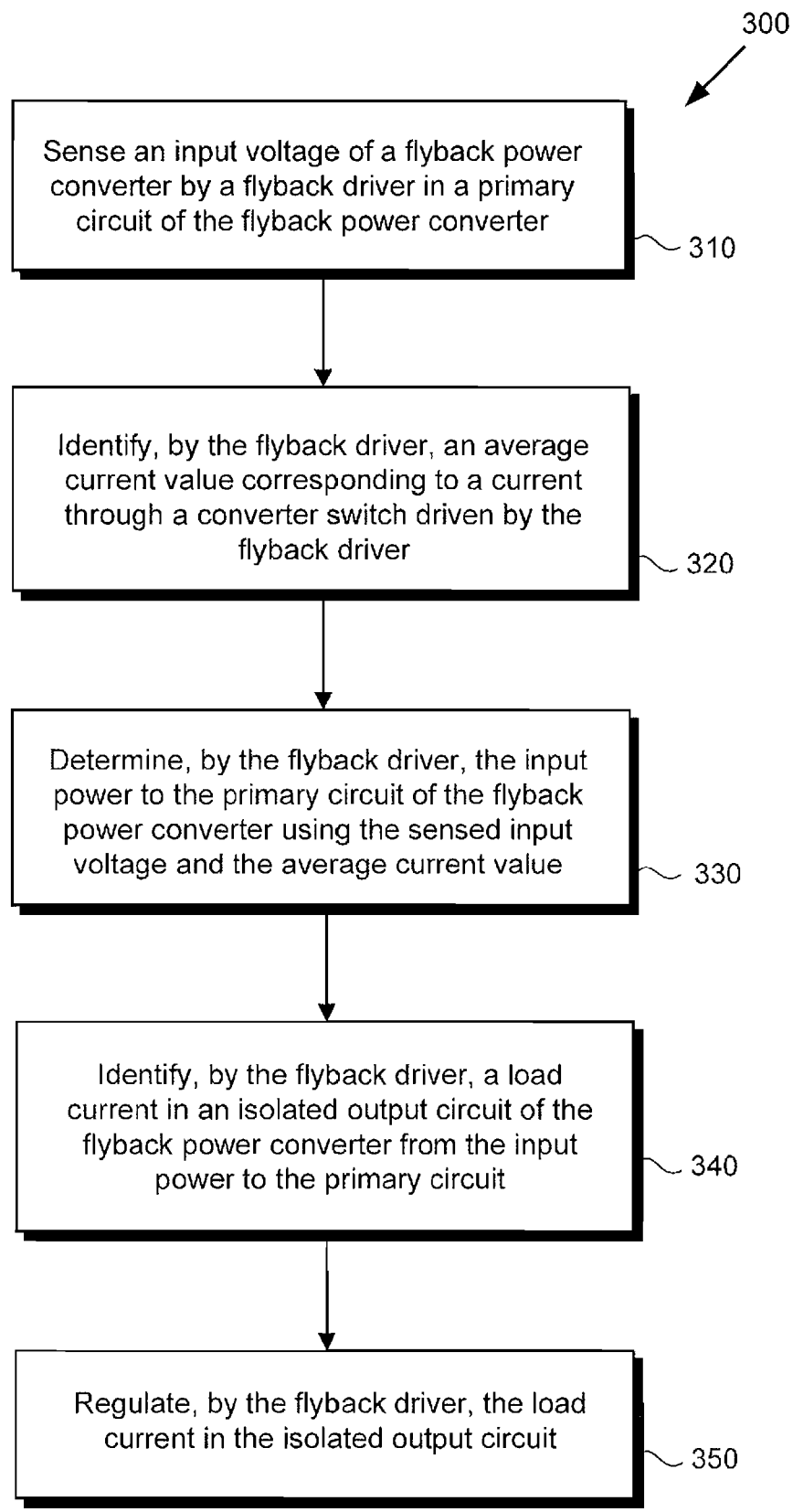

FLYBACK DRIVER FOR USE IN A FLYBACK POWER CONVERTER AND RELATED METHOD

BACKGROUND OF THE INVENTION

1. Field of the Invention

The present invention is generally in the field of electrical circuits and systems. More specifically, the present invention is in the field of power conversion and regulation in electrical circuits and systems.

2. Background Art

Power converters based on a flyback power supply topology can be used in a variety of electronic circuits and systems. For example, light-emitting diode (LED) drivers utilizing a flyback design offer an inexpensive solution providing an isolated output compliant with Underwriters Laboratories® (UL®) safety standards in fixtures that are not double insulated. In addition, such LED flyback drivers are typically capable of meeting Department of Energy (DOE) ENERGY STAR requirements, making the flyback topology an attractive design choice for relatively low power lighting applications.

Because the output of a flyback power converter is isolated from its primary circuit, many conventional approaches to providing power regulation require use of an opto-isolator to obtain feedback from the output. For example, when used as an LED driver, the LED output current is typically sensed and fed back to the primary circuit using the opto-isolator. However, addition of the opto-isolator circuitry to the flyback converter design adds cost and may reduce reliability in applications, such as LED lighting applications, where extended operating lifetimes are typically expected.

Due to the disadvantages associated with use of an opto-isolator, some flyback power converter designs use an alternative approach in which the current in the primary circuit is sensed as a proxy for the load current. Regulation of the output is then performed on the basis of the primary circuit current. This alternative approach works on the assumption that the input voltage and load do not change significantly, which has some value for a narrow range of highly predictable usage environments. However, for use over a wide input voltage range or with different loads, sensing the primary circuit current is inadequate, and a closed loop architecture including an opto-isolator is usually required.

Thus, there is a need to overcome the drawbacks and deficiencies in the conventional art by providing a flyback power converter and driver suitable for use over a wide input voltage range as well as differing loads, that does not require use of an opto-isolator or other dedicated feedback circuitry.

SUMMARY OF THE INVENTION

The present invention is directed to a flyback driver for use in a flyback power converter and related method, substantially as shown in and/or described in connection with at least one of the figures, and as set forth more completely in the claims.

BRIEF DESCRIPTION OF THE DRAWINGS

FIG. 3 is a flowchart of a method for use in a flyback power converter, according to one embodiment of the present invention.

DETAILED DESCRIPTION OF THE INVENTION

Figure 1:
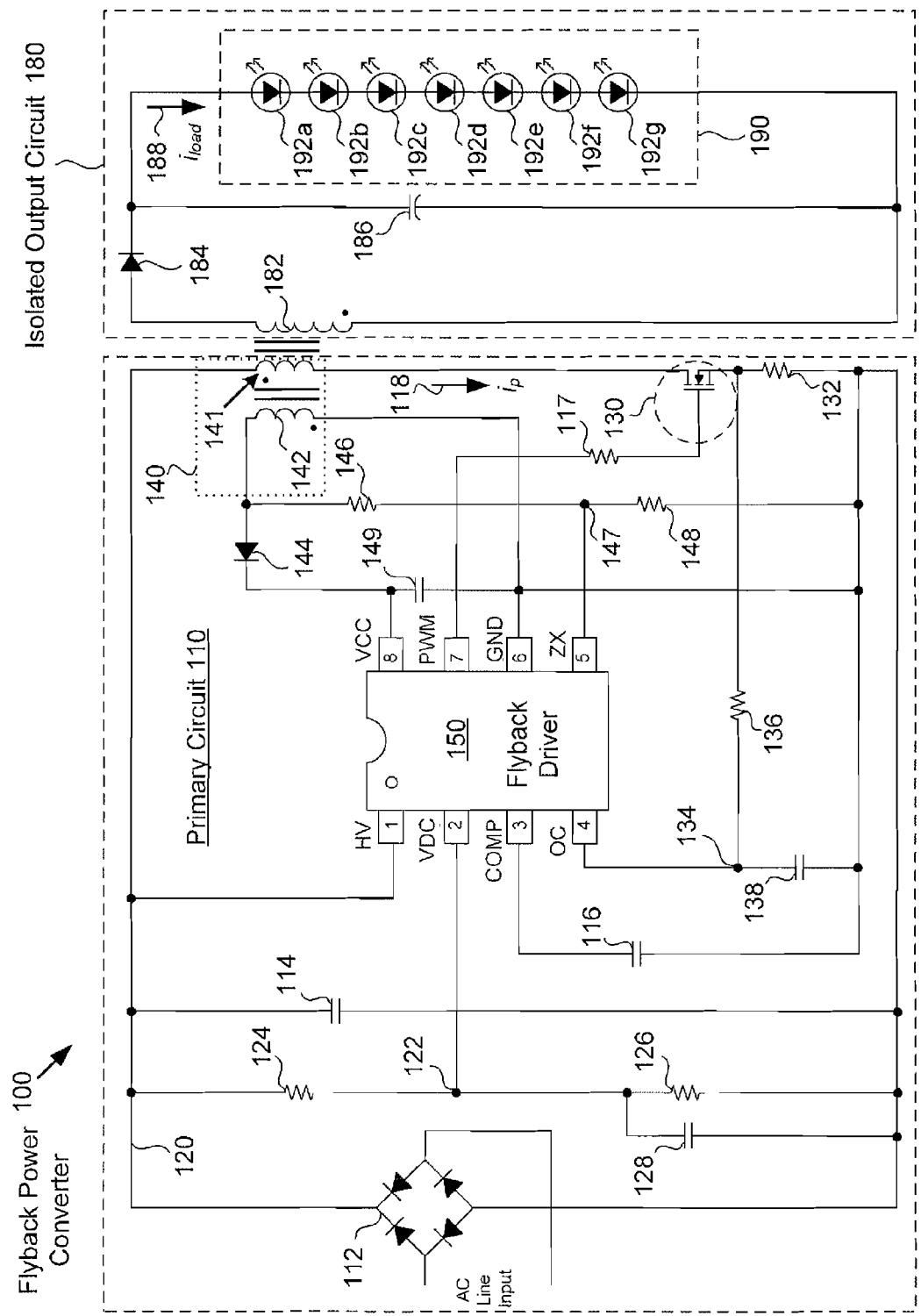
FIG. 1 shows a diagram of a flyback power converter including a flyback driver, according to one embodiment of the present invention.

The present invention is directed to a flyback driver for use in a flyback power converter, and related method. Although the invention is described with respect to specific embodiments, the principles of the invention, as defined by the claims appended herein, can obviously be applied beyond the specifically described embodiments of the invention described herein. Moreover, in the description of the present invention, certain details have been left out in order to not obscure the inventive aspects of the invention. The details left out are within the knowledge of a person of ordinary skill in the art.

The drawings in the present application and their accompanying detailed description are directed to merely example embodiments of the invention. To maintain brevity, other embodiments of the invention, which use the principles of the present invention, are not specifically described in the present application and are not specifically illustrated by the present drawings. It should be borne in mind that, unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 is a diagram showing flyback power converter 100 including flyback driver 150, according to one embodiment of the present invention. As shown in FIG. 1, according to the present embodiment, flyback power converter 100 comprises primary circuit 110 including converter switch 130, flyback inductor 140 having primary winding 141 and auxiliary winding 142, and flyback driver 150 having pins 1, 2, 3, 4, 5, 6, 7, and 8 (hereinafter "pins 1-8"). As further shown in FIG. 1, flyback power converter 100 also comprises isolated output circuit 180 including isolated output inductor 182 and providing load current 188 to power load 190, which in the present embodiment is shown as a plurality of light-emitting diodes (LEDs) including LED 192a, LED 192b, LED 192c, LED 192d, LED 192e, LED 192f, and LED 192g (hereinafter "LEDs 192a-192g") through which load current 188 flows. Also shown in FIG. 1 are rectifying diode 184 and ripple capacitor 186 of isolated output circuit 180.

Isolated output circuit 180 is responsive to primary circuit 110 by virtue of inductive coupling between primary winding 141 of flyback inductor 140 and isolated output inductor 182. For example, flyback driver 150 of primary circuit 110 can be used to drive converter switch 130 through resistor 117. When converter switch 130 is turned ON, primary current 118 rises as a magnetic field is established between flyback inductor 140 and isolated output inductor 182. When converter switch 130 is turned OFF, the magnetic field collapses as its stored energy is transferred to load 190 as load current 188 Is through rectifying diode 184. Ripple capacitor 186 is provided to remove ripple from load current 188.

In addition to resistor 117, converter switch 130, flyback inductor 140, and flyback driver 150, primary circuit 110 includes input rectifier 112 producing a substantially direct-current (DC) input voltage at high voltage rail 120, input voltage sensing node 122 situated between resistors 124 and 126, and input filter capacitors 114 and 128. Also included in primary circuit 110 are compensation capacitor 116, additional capacitors 138 and 149, primary current sense resistor 132, primary current sensing node 134, flyback inductor voltage sensing node 147, additional resistors 136, 146, and 148, and diode 144.

When powering LEDs, for example, it is desirable to provide a substantially constant current in order to maintain consistent light output, as well as to optimize operating life. Consequently, when, as in FIG. 1, flyback power converter 100 is implemented to power a load comprising LEDs 192a-192g, it may be desirable to regulate load current 188, rather than output voltage as in many power supplies. Conventional flyback power converter designs typically either require an opto-isolator to directly sense the load current in the isolated output circuit, or attempt to estimate the load current by measuring the peak current in the primary circuit. Unfortunately, the first approach adds cost and complexity to the circuit design, and may limit operating life due to premature failure of the opto-isolator itself, while the second approach cannot be relied upon for adequate regulation of the load current, thereby producing inconsistent light output and contributing to reduced operating life.

However, flyback power converter 100 represents an embodiment of a flyback power converter design from which an opto-isolator or other dedicated feedback circuitry is omitted, but which nevertheless is configured to provide substantially accurate regulation of load current 188. As will be described below, embodiments of the present invention achieve this advantageous result by being configured to identify load current 188 from the input power to primary circuit 110, and to regulate load current 188 according to the input power to primary circuit 110. That is to say, embodiments of the present invention enable substantially accurate regulation of load current 188 without requiring that primary circuit 110 receive feedback in the form of a control signal from isolated output circuit 180. For example, flyback driver 150, which may be implemented as an integrated circuit (IC), as shown in FIGS. 1, can be configured to multiply an average current value corresponding to primary current 118 in primary circuit 110 and an input voltage to primary circuit 110 to determine the input power. Flyback driver 150 can be further configured to identify load current 188 in isolated output circuit 180 from the input power to primary circuit 110, and to regulate load current 188 accordingly, such as through appropriate activation and deactivation of converter switch 130, for example.

Figure 2:
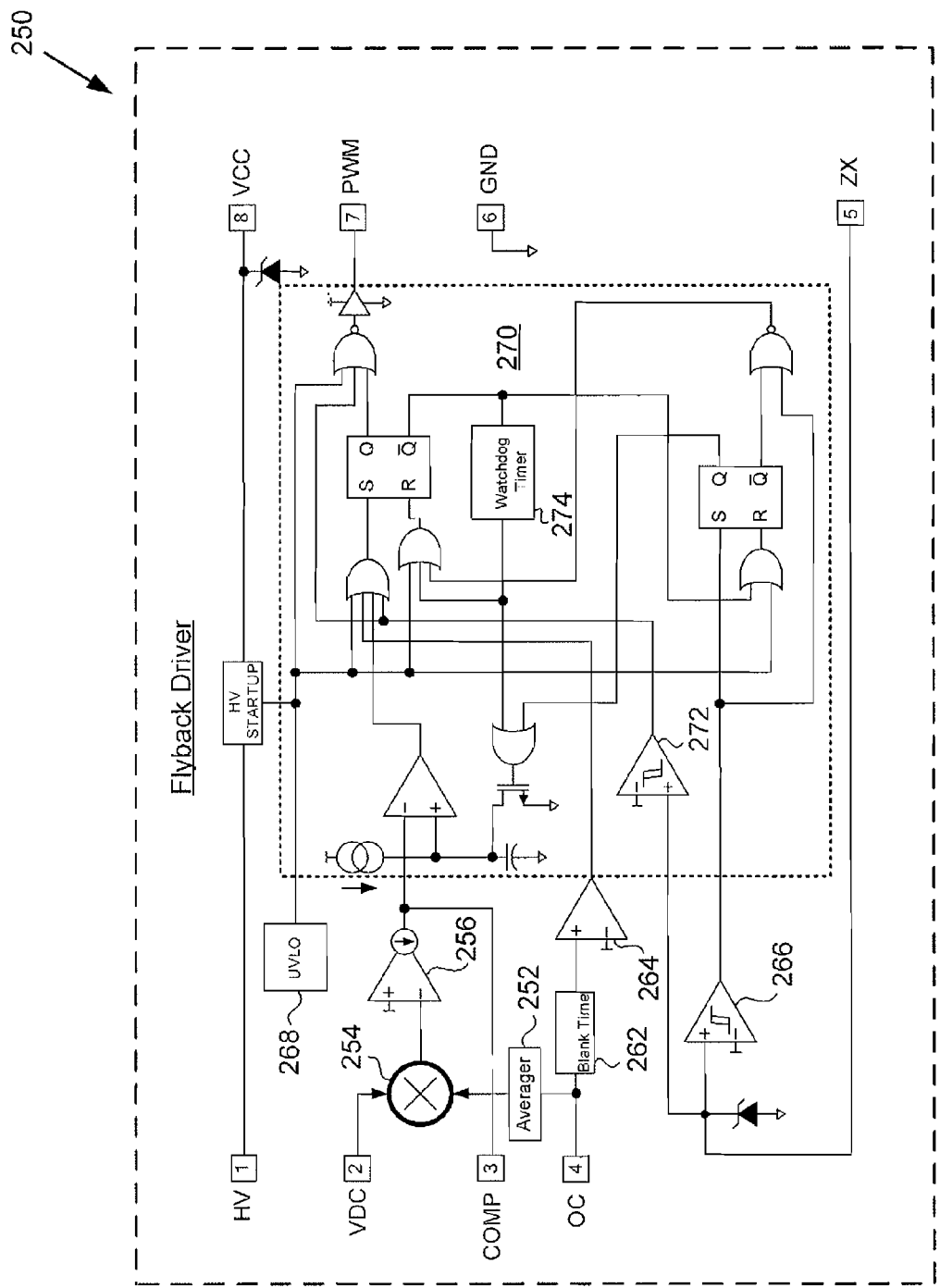
FIG. 2 shows a more detailed diagram of a flyback driver for use in a flyback power converter, according to one embodiment of the present invention.

FIG. 2 shows a more detailed diagram of selected features of flyback driver 250 implemented as an IC for use in a flyback power converter, such as flyback power converter 100 in FIG. 1, according to one embodiment of the present invention. Flyback driver 250 having pins 1-8, in FIG. 2, corresponds to flyback driver 150 having respectively corresponding pins 1-8, in FIG. 1. As shown by FIGS. 1 and 2, pin 1 provides a high voltage (HV) input to flyback driver 150/250 by coupling flyback driver 150/250 to high voltage rail 120. In one embodiment, as represented in FIGS. 1 and 2, pin 1 can be used to power flyback driver 250 during an initial startup interval, after which power for flyback driver 250 can be provided through pin 8. That is to say, as shown in FIG. 1, during normal operation of flyback power converter 100, flyback driver 150 can be powered through VCC pin 8 using auxiliary winding 142 of flyback inductor 140 and diode 144. In addition, it is noted that pin 6 serves as a ground reference for flyback driver 110.

The functionality associated with pins 2, 4, and 5 will be described in greater detail below. For the present it is merely noted that flyback driver 250 comprises multiplier 254 receiving an input from pin 2 as well as an input through averager circuit 262 from pin 4. Flyback driver 250 is further shown to comprise operational transconductance amplifier (OTA) 256 receiving an input signal provided by multiplier 254 as an output signal from multiplier 254. The output of OTA 256 is provided to control block 270, which is shown to include hysteretic comparator 272 and watchdog timer 274, as well as logic elements, and is configured to produce a PWM output at pin 7 for controlling operation of converter switch 130, in FIG. 1. The output of OTA 256 is also coupled through COMP pin 3 to compensation capacitor 116, shown in FIG. 1, which is alternately charged and discharged through pin 3 depending upon the output provided by OTA 256.

Also shown in FIG. 2 is comparator 264 of flyback driver 250, receiving input from pin 4 through blank time circuit 262, and undervoltage-lockout (UVLO) block 268 as known in the art. In addition, flyback driver 250 is shown to comprise flyback hysteretic comparator 266 receiving input through ZX pin 5. According to one embodiment, ZX pin 5 can be implemented to serve the dual purposes of providing over voltage control through control block 270 and for maintaining operation of flyback driver 250 in critical conduction mode, for example, also known in the art as transition mode.

The operation of flyback power converter 100 including flyback driver 150/250 will be described in greater detail in combination with FIG. 3, which presents flowchart 300 of a method for use in a flyback power converter, such as flyback power converter 100, in FIG. 1, according to one embodiment of the present invention. Certain details and features have been left out of flowchart 300, in FIG. 3, that are apparent to a person of ordinary skill in the art. For example, a step may comprise one or more substeps or may involve specialized equipment or materials, as known in the art. While steps 310 through 350 indicated in flowchart 300 are sufficient to describe one embodiment of the present invention, other embodiments of the invention may utilize steps different from those shown in flowchart 300, or may comprise more, or fewer, steps.

Referring to step 310 in FIG. 3 and flyback power converter 100 in FIG. 1, step 310 of flowchart 300 comprises sensing an input voltage of flyback power converter 100 by flyback driver 150 in primary circuit 110 of flyback power converter 100. Step 310 may be performed by flyback driver 150 through VDC pin 2 connected to input voltage sensing node 122, for example, as shown in FIG. 1. Input voltage sensing node 122 is shown to be located between resistors 124 and 126, which provide a voltage divider for stepping down a rectified input voltage to primary circuit 110 of flyback is power converter 100, present as a substantially DC voltage at high voltage rail 120.

Continuing with step 320, in FIG. 3, with continued reference to flyback power converter 100, in FIG. 1, step 320 of flowchart 300 comprises identifying, by flyback driver 150, an average current value corresponding to a current through converter switch 130 driven by flyback driver 150. As may be understood from FIG. 1, operation of flyback power converter 100 produces primary current 118 through primary winding 141 of flyback inductor 140 and converter switch 130 when converter switch 130 is turned ON. Due to the influence of flyback inductor 140, primary current 118 will take the form of a ramp current through primary winding 141 and converter switch 130. That ramp current can be sensed by flyback driver 150 through OC pin 4 connected to primary current sensing node 134. As shown in FIG. 1, according to one embodiment, primary current sensing node 134 may be coupled across primary current sense resistor 132 by the filter arrangement of resistor 136 and capacitor 138.

As noted above, the current sensed at primary current sensing node 134 is contemplated as comprising a ramp current. Referring now to FIG. 2, identification of an average current value corresponding to the ramp current, in step 320 of flowchart 300, may be performed by flyback driver 250 using averager circuit 262 implemented so as to receive the ramped input at pin 4. According to one embodiment of the present invention, averager circuit 262 of flyback driver 250 is configured to receive the ramped input corresponding to primary current 118, and to provide a DC voltage output corresponding to an average value of the ramped input, to multiplier 254.

Moving to step 330 of flowchart 300, step 330 comprises determining the input power to primary circuit 110 of flyback power converter 100 using the sensed input voltage of step 310 and the average current value identified in step 320. Step 330 may be performed by flyback converter 250, in FIG. 2, using multiplier 254. Multiplier 254 may be advantageously implemented as an analog circuit, for example. As shown in FIG. 2, in addition to receiving an average current value corresponding to primary current 118 as an input from averager circuit 252, multiplier 254 is further configured to receive the sensed input voltage to the flyback power converter through VDC pin 2. As a result, the embodiment of FIG. 2 shows that multiplier 254 is implemented so as to multiply the input voltage and average current values of primary circuit 110, and to produce an output corresponding to the input power to primary circuit 110.

Referring to step 340 in FIG. 3, step 340 of flowchart 300 comprises identifying load current 188 of isolated output circuit 180 from the input power to primary circuit 110 determined in step 330. Step 340 may be performed by flyback converter 250, in FIG. 2, using control block 270. As shown in FIG. 2, the output of multiplier 254, corresponding to the input power to primary circuit 110, in FIG. 1, is provided as an input to OTA 256. As further shown in FIG. 2, OTA 256 is configured to compare the output provided by multiplier 254 to a reference value, and to provide an OTA output to control block 270.

Because load 190 comprising LEDs 192a-192g presents a substantially fixed voltage drop, load current 188 is substantially proportional to the input power to primary circuit 110 of flyback power converter 100. Consequently, control block 270 can be configured to utilize an appropriate proportionality factor, which may be predetermined for use by control block 270, for example, to identify load current 188 from the input power to primary circuit 110, as determined from the output of multiplier 254.

Continuing to step 350, step 350 of flowchart 300 comprises regulating load current 188 in isolated output circuit 180. Step 350 may be performed by flyback driver 250, for example through use of control block 270, to provide a control output for driving converter switch 130, in FIG. 1, from PWM pin 7. Thus, according to embodiments of the present invention, load current 188 in isolated output circuit 180 can be identified and regulated according to the input power to primary circuit 110. Moreover, that identification and regulation can be performed using flyback driver 150 of primary circuit 110 without receiving a control signal, such as an opto-isolator feedback signal, from isolated output circuit 180, as is typically required in conventional implementations.

One potential vulnerability of the flyback power converter architecture results from the high output voltages that can be produced in the absence of a load, such as load 190. As a result, embodiments of the present invention incorporate an open load over voltage limiting functionality. Referring, for example, to flyback power converter 100, in FIG. 1, it may be understood that the voltage across primary winding 141 of flyback inductor 140 may be monitored by sensing the voltage across auxiliary winding 142 of flyback inductor 140. According to the embodiment shown in FIG. 1, the voltage across auxiliary winding 142 may be sensed by flyback driver 150 through ZX pin 5, connected to flyback inductor voltage sensing node 147 between resistors 146 and 148, which provide a voltage divider for stepping down the voltage across auxiliary winding 142 of flyback inductor 140.

As shown by FIG. 2, the input received by flyback driver 250 at pin ZX can be compared to an over voltage reference using hysteretic comparator 272 of control block 270. When the reference threshold is exceeded, logic elements internal to control block 270 prevent an activation signal from being provided as an output from PWM pin 7. As a result, and referring again to FIG. 1, converter switch 130 is advantageously turned OFF in response to the voltage across flyback inductor 140 exceeding a threshold voltage. Flyback driver 250 can be further configured to enter a hiccup mode, as known in the art, after detection of an excessive flyback inductor voltage, until a load, such as load 190, in FIG. 1, is reconnected. For example, watchdog timer 274 of control block 270 can be used to reinitiate operation of flyback power converter after a delay interval, such as an approximately 300 µs delay interval, for example.

Thus, by sensing an input voltage, and identifying an average current value of a s primary circuit in a flyback power converter, the present invention teaches embodiments of a flyback driver configured to obtain information enabling a determination of the input power to the flyback power converter. In addition, by implementing a flyback driver to include a multiplier circuit, such as an analog multiplier, the present invention teaches a flyback driver configured to determine the input power to the flyback power converter. Moreover, by utilizing the determined input power to identify a load current in an isolated output circuit of the flyback power converter, the present invention teaches a solution for regulating the load current without receiving a control signal, such as a feedback signal, from the isolated output circuit.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. The described embodiments are to be considered in all respects as illustrative and not restrictive. It should also be understood that the invention is not limited to the particular embodiments described herein, but is capable of many rearrangements, modifications, and substitutions without departing from the scope of the invention.

The invemtion claimed is:

1. A flyback power converter comprising:
   a primary circuit including a flyback inductor and a flyback driver configured to receive power from an auxiliary winding of said flyback inductor;
   an isolated output circuit including an isolated output inductor responsive to said primary circuit, said isolated output circuit powering a load;
   said flyback driver coupled to a high voltage rail of said primary circuit and configured to identify a load current in said isolated output circuit from an input power to said primary circuit, and to regulate said load current according to said input power.

2. The flyback power converter of claim 1, wherein said flyback driver is configured to identify and regulate said load current without receiving a control signal from said isolated output circuit.

3. The flyback power converter of claim 1, wherein said load comprises at least one light-emitting diode (LED), and wherein said load current flows through said at least one LED.

4. The flyback power converter of claim 1, wherein said flyback driver is implemented as an integrated circuit (IC).

5. The flyback power converter of claim 1, wherein said flyback driver is configured to multiply an average current value and an input voltage to said flyback power converter, thereby determining said input power to said primary circuit.

6. The flyback power converter of claim 5, wherein said flyback driver comprises an analog multiplier configured to multiply said average current value and said input voltage.

7. The flyback power converter of claim 5, wherein said average current value corresponds to an average of a ramp current produced by said primary circuit.

8. A flyback driver in a primary circuit including a flyback inductor and configured for use in a flyback power converter, said flyback driver coupled to a high voltage rail of said primary circuit, said flyback driver configured to receive power from an auxiliary winding of said flyback inductor, to identify a load current in an isolated output circuit, including an isolated output inductor responsive to said primary circuit, according to an input power to said primary circuit of said flyback power converter, and to regulate said load current according to said input power.

9. The flyback driver of claim 8, wherein said flyback driver is configured to identify and regulate said load current without receiving a control signal from said isolated output circuit.

10. The flyback driver of claim 8, wherein at least one light-emitting diode (LED) is utilized as a load, and wherein said load current flows through said at least one LED.

11. The flyback driver of claim 8, wherein said flyback driver is implemented as an integrated circuit (IC).

12. The flyback driver of claim 8, wherein said flyback driver comprises an analog multiplier configured to multiply an average current value and an input voltage to said flyback power converter, thereby determining said input power to said primary circuit.

13. The flyback driver of claim 12, wherein said average current value corresponds to an average of a ramp current produced by said primary circuit.

14. A method for use in a flyback power converter, said method comprising:

powering a flyback driver in a primary circuit of said flyback power converter using an auxiliary winding of a flyback inductor in said primary circuit, said flyback driver being coupled to a high voltage rail of said primary circuit;

determining, by said flyback driver, an input power to said primary circuit;

utilizing said input power, by said flyback driver, to identify a load current in an isolated output circuit in said flyback power converter, said isolated output circuit including an isolated output inductor responsive to said primary circuit;

regulating, by said flyback driver, said load current according to said input power.

15. The method of claim 14, wherein identifying and regulating said load current is performed without receiving a control signal from said isolated output circuit.

16. The method of claim 14, wherein said load current is used to power a load comprising at least one light-emitting diode (LED), and wherein said load current flows through said at least one LED.

17. The method of claim 14, further comprising:
sensing a flyback inductor voltage in said primary circuit;
turning a converter switch of said primary circuit OFF when said flyback inductor voltage exceeds a threshold voltage.

18. The method of claim 14, wherein determining said input power to said primary circuit comprises:
sensing an input voltage to said flyback power converter;
identifying an average current value corresponding to a current through a converter switch in said primary circuit;
multiplying said average current value and said input voltage to determine said input power to said primary circuit.

19. The method of claim 18, wherein multiplying said average current value and said input voltage is performed using an analog multiplier.

20. The method of claim 18, wherein said average current value corresponds to an average of a ramp current produced by said primary circuit.

* * * * *